United States Patent Office.

ENOCH CARTER, OF NEWBURG, NEW YORK.

Letters Patent No. 63,702, dated April 9, 1867.

---

IMPROVEMENT IN PURIFYING AND PREPARING GLASS ORE.

---

The Schedule referred to in these Letters Patent and making part of the same.

---

TO ALL WHOM IT MAY CONCERN:

Be it known that I, ENOCH CARTER, of Newburg, Orange county, New York, have invented a new and useful Improvement in Purifying and Preparing Glass Ore; and I do hereby declare that the following is a full, clear, and exact description thereof, which will enable others skilled in the art to make and use the same.

The object of this invention is to so purify and prepare the rock called glass ore (a recently discovered mineral) as to adapt it to many useful and ornamental purposes; and the invention consists in preparing it in the form of what is known as "cullet" by glass-makers, and this consists in subjecting the rock or glass ore (either crushed or in the lump) and either with or without an alkaline mixture or salt to the action of heat in a reverberatory or other furnace, and dropping the product in water as "cullet," or using it in lump as it comes from the furnace.

It has been ascertained, after many experiments, that after being thus desulphurized and purified the ore can be profitably employed in the manufacture of many useful articles, as buttons, door or drawer knobs, and all articles of glass-ware where colored glass is not objectionable, and also as a substitute for jet in articles of jewelry, as well as all other useful and ornamental articles to which it is adapted.

In thus purifying the ore and forming the "cullet" I do not confine myself to any particular chemical ingredients for mixing with the ore. As before stated, my invention consists in purifying the ore in such a manner as to render it suitable for many purposes to which it is not well adapted in its crude or native state. The cullet can be used or melted alone in the pot, or it may be used to good advantage for many useful articles in combination with the crude ore.

Having thus described my invention, I claim as new, as far as my invention is now perfected—

1. Melting the glass ore or rock in a reverberatory or other furnace with or without alkalies or salt as a flux, and using the product in lump as it comes from the furnace, or dropping it in water as "cullet."

2. The use of this cullet for the manufacture of glass, either alone or in combination with the crude ore, with alkaline, sand, lime, quartz, or other material.

ENOCH CARTER.

Witnesses:
WM. F. McNAMARA,
ALEX. F. ROBERTS.